(12) United States Patent
Shin et al.

(10) Patent No.: US 8,165,254 B2
(45) Date of Patent: Apr. 24, 2012

(54) APPARATUS AND METHOD FOR RECEIVING SIGNAL FOR EXTENT LIMITATION OF TIMING SYNCHRONIZATION IN MB-OFDM UWB SYSTEM

(75) Inventors: Cheol Ho Shin, Daejeon (KR); Byoung Hak Kim, Daejeon (KR); Sang Sung Choi, Daejeon (KR); Kwang Rho Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 864 days.

(21) Appl. No.: 12/201,084

(22) Filed: Aug. 29, 2008

(65) Prior Publication Data
US 2009/0154532 A1 Jun. 18, 2009

(30) Foreign Application Priority Data
Dec. 17, 2007 (KR) .................. 10-2007-0132577

(51) Int. Cl.
H04L 7/00 (2006.01)
(52) U.S. Cl. ........ 375/355; 375/150; 375/360; 370/510; 370/512
(58) Field of Classification Search .................. 375/142, 375/143, 150, 343, 344, 354, 355, 360; 370/503, 370/509, 510, 512–515
See application file for complete search history.

(56) References Cited

U.S. PATENT DOCUMENTS

| 5,276,706 A * | 1/1994 | Critchlow ............... 375/343 |
| 7,333,532 B2 * | 2/2008 | Baltersee et al. ......... 375/148 |
| 7,668,273 B2 * | 2/2010 | Paul et al. ............... 375/354 |
| 7,715,510 B2 * | 5/2010 | Liang et al. ............. 375/365 |
| 2002/0105973 A1 * | 8/2002 | Kato et al. .............. 370/503 |
| 2008/0101442 A1 * | 5/2008 | Rasmussen ............ 375/148 |

FOREIGN PATENT DOCUMENTS

| KR | 2001-0002477 | 1/2001 |
| KR | 1020010002477 A | 1/2001 |
| KR | 1020040082043 | 9/2004 |
| KR | 2007-0061027 | 6/2007 |
| KR | 1020070061027 A | 6/2007 |

OTHER PUBLICATIONS

"Optimum Frame and Frequency Synchronization for OFEM Systems" by Charles J. You et al. On Consumer Electronics, 2001. ICCE. International Conference as of Jun. 2001.
"Robust Timing Synchronization for OFEM based Wireless LAN System" by Sridhar Nandula et al. on TENCON 2003. Conference on Convergent Technologies for Asia-Pacific Region as of Oct. 2003.
Korean Office Action issued Dec. 9, 2008 in corresponding Korean application No. 2007-132577.
Seok Jun Ko, "Digital Fine Timing Tracker for Correlation Detection Receiver in IR-UWB Communication System," Korea Information and Community Society, vol. 31, Sep. 2006.
Korean Office Action issued on Mar. 26, 2009 in corresponding Korean Patent Application 10-2007-0132577.

* cited by examiner

*Primary Examiner* — Dac Ha
(74) *Attorney, Agent, or Firm* — Staas & Halsey LLP

(57) ABSTRACT

The present invention relates to an apparatus and a method for receiving signal for extent of timing synchronization in MB-OFDM UWB System. The invention divides the digital samples completed of sampling twice as much as minimum sampling clock required to restore the MB-OFDM received signal into ODD data path and EVEN data path, executes the packet detection and timing synchronization for each of divided path and selects the data of path with larger cross correlation value at the timing synchronization point to secure the stable receiving performance in system environment with severe frequency offset and prevent the FTT window shift within preamble section through adding minimum hardware and structural change without increasing the system clock.

11 Claims, 15 Drawing Sheets

| 32 zeros | $C_0 \sim C_{127}$ | |
|---|---|---|
| 0.061us | 0.242us | 0.009us |

FFT Window : ZP Direction

FFT Window : Guard Interval Direction

| ppm | Sampling clock offset (KHz) | Dislocation Time per 1 Sample (us) | Number of Symbols per Dislocation of 1 Sample (Symbols) | Sampling Section per Dislocation of Symbol (Ts) | Maximum Phase Difference per Dislocation of Symbol (°) |
|---|---|---|---|---|---|
| 1 | 0.528 | 1893.939394 | 6060.606061 | 0.000165 | 0.0297 |
| 10 | 5.28 | 189.3939394 | 606.0606061 | 0.00165 | 0.297 |
| 40 | 21.12 | 47.34848485 | 151.5151515 | 0.0066 | 1.188 |

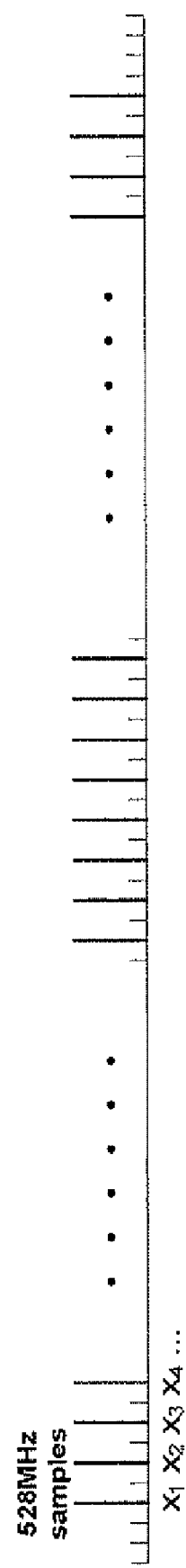

FIG. 11

| Occurrence Of FFT Window Shift | Section | 1 | 2 | 3 | 4 | 5 | 6 | 7 | 8 | 9 |
|---|---|---|---|---|---|---|---|---|---|---|
| No | Average | 0.30 | -0.15 | 0.18 | -0.07 | 0.04 | 0.60 | 0.14 | 0.08 | -0.09 |
| No | Standard Deviation | 4.45 | 3.17 | 2.92 | 3.00 | 2.03 | 1.94 | 1.74 | 1.43 | 1.44 |
| Yes | Average | -5.82 | 4.45 | 1.03 | 3.29 | 0.06 | -0.79 | -0.87 | -1.10 | -0.74 |
| Yes | Standard Deviation | 27.68 | 24.61 | 25.19 | 18.09 | 16.93 | 17.95 | 11.52 | 11.44 | 8.67 |

SNR (Signal to Noise Ratio)

Unit : ppm

APPARATUS AND METHOD FOR RECEIVING SIGNAL FOR EXTENT LIMITATION OF TIMING SYNCHRONIZATION IN MB-OFDM UWB SYSTEM

CROSS-REFERENCE TO RELATED APPLICATIONS

This application claims priority under 35 U.S.C. §119 to Korean Patent Application No. 10-2007-132577, filed on Dec. 17, 2007, the disclosure of which is incorporated herein by reference in its entirety.

BACKGROUND OF THE INVENTION

1. Field of the Invention

The present invention relates to a multi-band orthogonal frequency division multiplexing ultra wide-band (MB-OFDM UWB) system, and more particularly, to an apparatus and a method for receiving signal for extent of timing synchronization in MB-OFDM UWB System which is capable of securing the stable receiving performance in system environment with severe frequency offset.

This work was supported by the IT R&D program of MIC/IITA. [2006-S-071-02, A Development of high speed multimedia transmission UWB Solution]

2. Description of the Related Art

Timing synchronization algorithm in packet communication system applied of previous orthogonal frequency division multiplexing (OFDM) system used the method to locate the peak of correlation value at receiving-end after forming preamble using the sequence excellent in correlation property. Timing synchronization algorithm using sequence excellent in correlation property was mainly applied to IEEE 802.11a system.

Timing synchronization algorithm is finding the boundary of short training symbol and long training symbol section by executing the cross-correlation and peak detection using short training symbol or long training symbol as its standard signal. In paper 'Optimum frame and frequency synchronization for OFDM systems' published in Consumer Electronics, 2001, method to find the frame synchronization through correlation between the matched filter coefficient at receiving-end and received short sequence using the IEEE 802.11a OFDM preamble structure was disclosed. In the paper 'Robust timing synchronization for OFDM based wireless LAN system' presented in TENCON 2003, Conference, specific operation to acquire frame synchronization using the average of single short symbol was disclosed.

These timing synchronization technologies are to effectively implement the timing synchronization algorithm using sequence excellent in correlation property of which do not consider the fact that sampling may begin at random location even if it is the same sample section generated during the conversion of analogue signal to digital signal that may occur in analog to digital converter (ADC) and FFT window transition based on sampling clock offset. Namely, there is a problem for previous algorithms that uses the phase difference between same samples of two OFDM symbols among received preamble symbols in that error may occur with dislocation of sample location with the FFT window shift between the two OFDM symbols in comparison by sampling clock offset of sending and receiving-end.

SUMMARY

Therefore, an object of the present invention is to provide an apparatus and a method for receiving signal for extent limitation of timing synchronization in MB-OFDM UWB system which can secure the stable receiving performance in system environment with severe frequency offset.

Another object of the present invention is to provide an apparatus and a method for receiving signal for extent limitation of timing synchronization in MB-OFDM UWB system which can prevent the shift of FFT window within preamble section minimizing the additional burden in ASIC (Application Specific Integrated Circuit) design. Especially, the object of the present invention is to propose the receiving structure that prevents FTT Window shift within preamble section by adding minimum hardware and structural change without increasing the internal system clock not to be a burden in future ASIC design in designing the receiving structure of MB-OFDM UWB system of which uses the time frequency hopping that demands the sampling clock of minimum 528 MHz.

To achieve these and other advantages and in accordance with the purpose(s) of the present invention as embodied and broadly described herein, an aspect of the present invention provides an apparatus for receiving signal for extent limitation of timing synchronization in MB-OFDM UWB system which comprises two shift registers configured to divide the digital samples completed of sampling by ADC into the $1^{st}$ data and $2^{nd}$ data path, two packet detectors and timing synchronizer configured to execute the packet detection and timing synchronization of $1^{st}$ data and $2^{nd}$ data path respectively and a comparator that compares the cross correlation value at timing synchronization point at $1^{st}$ and $2^{nd}$ data path and a path selector configured to select the data of path with larger cross correlation value between above $1^{st}$ data path and $2^{nd}$ data path based on the outcome of comparison executed by the comparator.

To achieve these and other advantages and in accordance with the purpose of the present invention as embodied and broadly described herein, another aspect of the present invention provides a method for receiving signal system for extent limitation of timing synchronization in MB-OFDM UWB system comprises dividing digital samples completed of sampling twice as much as minimum sampling clock required to restore the MB-received signal, stage that divides above received data completed of sampling into $1^{st}$ data path and $2^{nd}$ data path with above minimum sampling clock, executing the packet detection and timing synchronization for each of above $1^{st}$ data path and $2^{nd}$ data path, comparing the cross correlation value at timing synchronization point of above $1^{st}$ and $2^{nd}$ data path and selecting the data of path with larger cross correlation value between $1^{st}$ and $2^{nd}$ data path.

The minimum sampling clock may be 528 MHz. The $1^{st}$ data may be ODD data and the $2^{nd}$ data may be EVEN data. The extent of timing synchronization may be limited within 0.25 sample section and maximum transition value of FFT window does not deviate from extent of timing synchronization limited within 0.25 sample section when data of path with larger cross correlation value is selected.

Additional advantages, objects, and features of the invention will be set forth in part in the description which follows and in part will become apparent to those having ordinary skill in the art upon examination of the following may be learned from practice of the invention. The objects and advantage of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 illustrates the digital samples completed of sampling at ADC;

FIG. 11 illustrates the simulation analysis on frequency offset estimated error based on shift of FFT window;

DETAILED DESCRIPTION OF EMBODIMENTS

Figure 1:
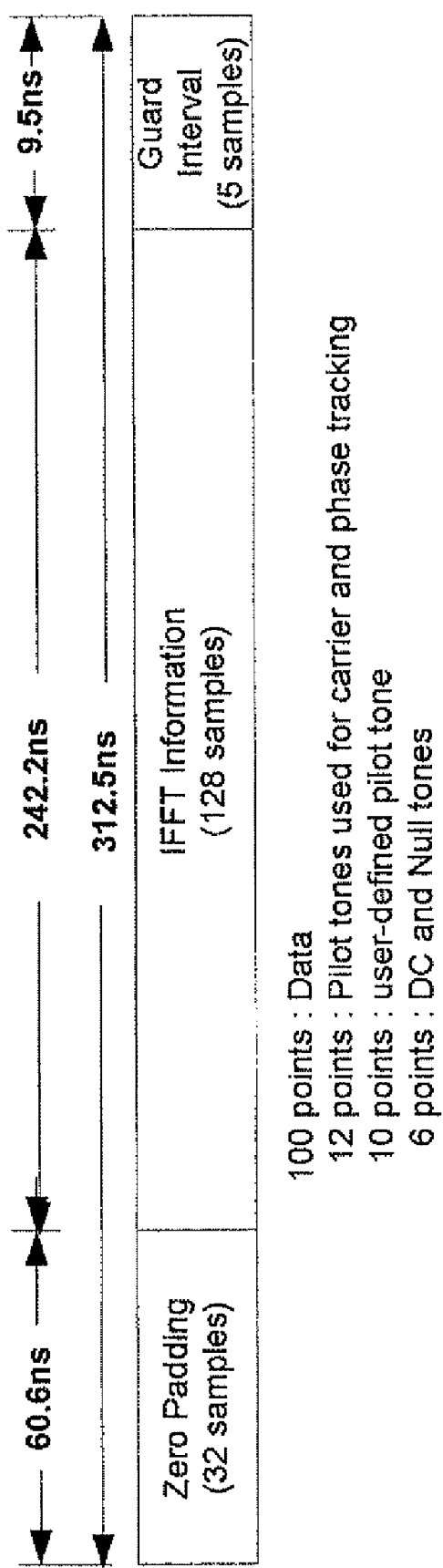
FIG. 1 is a block diagram of the symbol structure of MB-OFDM UWB system.

FIG. 1 is a block diagram of symbol structure of the MB-OFDM UWB system. UWB is the ultra high-speed wireless specification using the frequency band of either 3.1 GHz or 10.6 GHz. It adopts the MB-OFDM that divides the frequency band into several 528 MHz band for frequency hopping.

In other OFDM systems including IEEE802.11a (WLAN) and etc, CP that repeatedly sends ¼ of the last samples of valid OFDM symbol to the front of OFDM symbol is used to avoid the ISI caused by the multi-path channel. However, as presented in FIG. 1, MB-OFDM UWB system with strict restriction in TX power sends the 32 zeros instead of CP to increase the valid TX power and structures the OFDM symbol with total 165 samples including the 128 IFFT output samples and 5 zeros for channel switching and its sampling clock is 528 MHz.

Figures 2, 3:
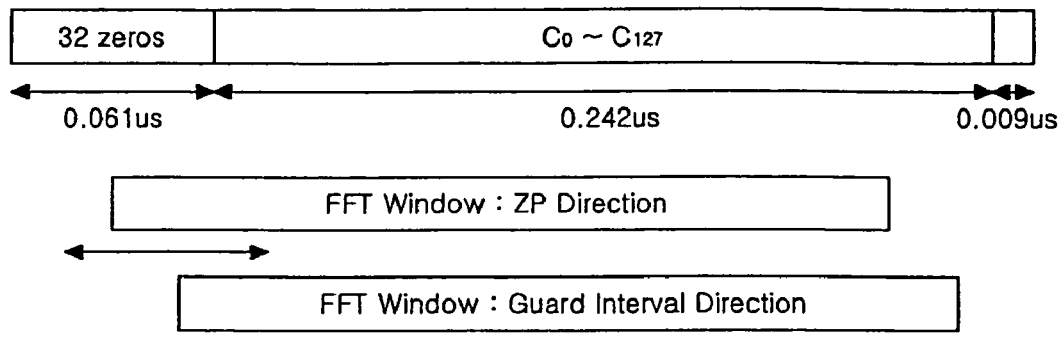
FIG. 2 illustrates the transition of FFT window by sampling clock offset.
FIG. 3 illustrates transition of FFT window by sampling clock offset in numbers.

With existence of sampling clock offset, FTT window to receive the OFDM symbol moves toward ZP direction or guard interval direction accordingly with progress of OFDM symbol within a packet based on the sampling clock offset from ideal FFT window as presented in FIG. 2. FIG. 2 illustrates the transition of FFT window by sampling clock offset.

When calculating the maximum rotation of frequency per symbol after FFT window transition and FFT passing by sampling clock offset based on the clock offset in unit of ppm regarding ADC sampling clock 528 MHZ is as FIG. 3. FIG. 3 illustrates the transition of FFT window based on sampling clock offset in numbers.

In case there is frequency offset of 40 ppm between sending/receiving LO, the dislocated value of sample per OFDM symbol is 0.0066 sample section (Ts) and 128 FFT window also transits in 0.0066 sample section per OFDM symbol as seen from FIG. 3.

Figure 4:
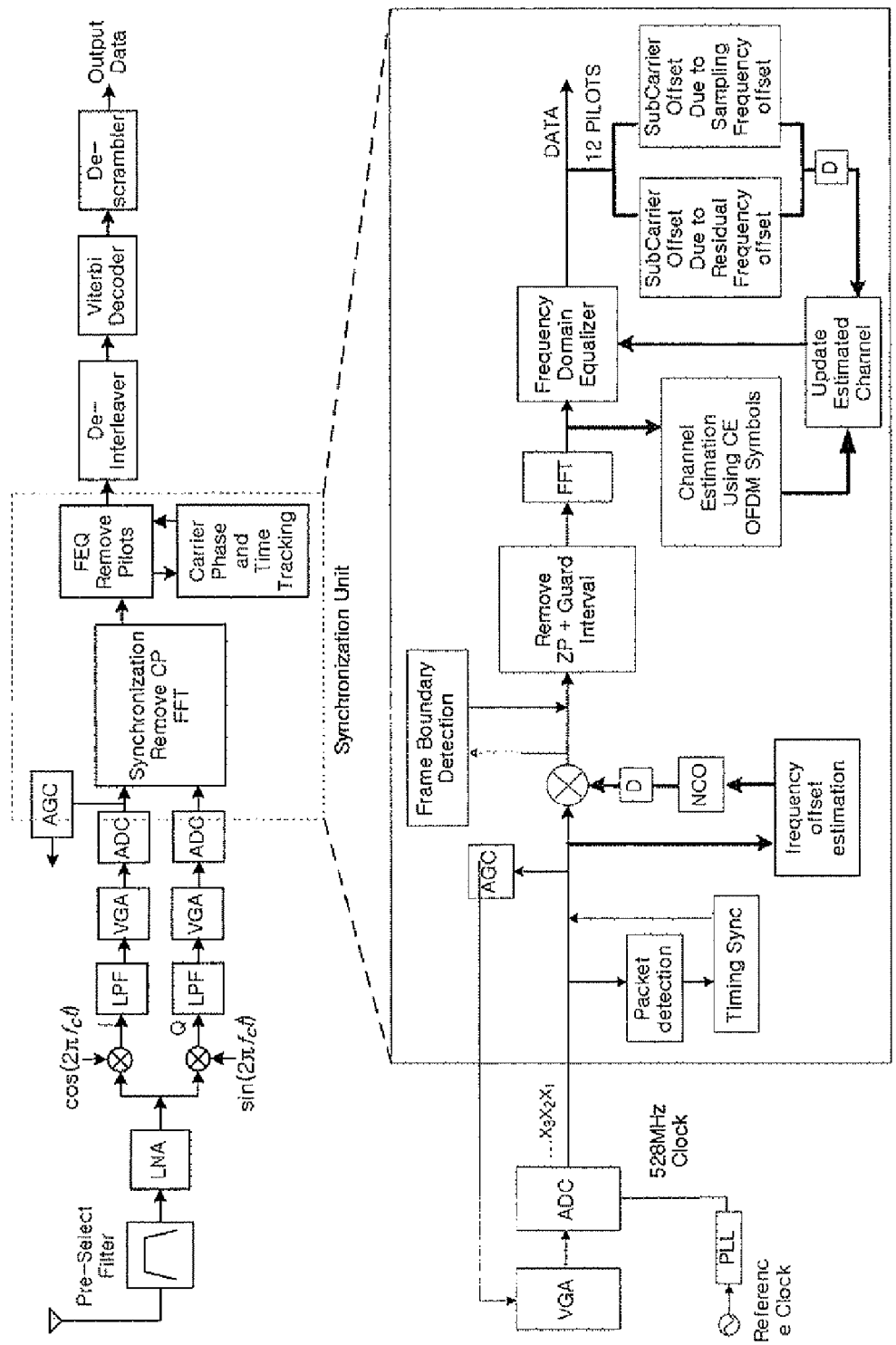
FIG. 4 illustrates the receiving structure of MB-OFDM UWB system.

Minimum sampling clock of ADC required in restoring the MB-OFDM UWB received signal is 528 MHz and receiving structure using digital samples completed of sampling with 528 MHz can be formed as FIG. 4. FIG. 4 illustrates the receiving structure of MB-OFDM UWB system.

Figure 5A:
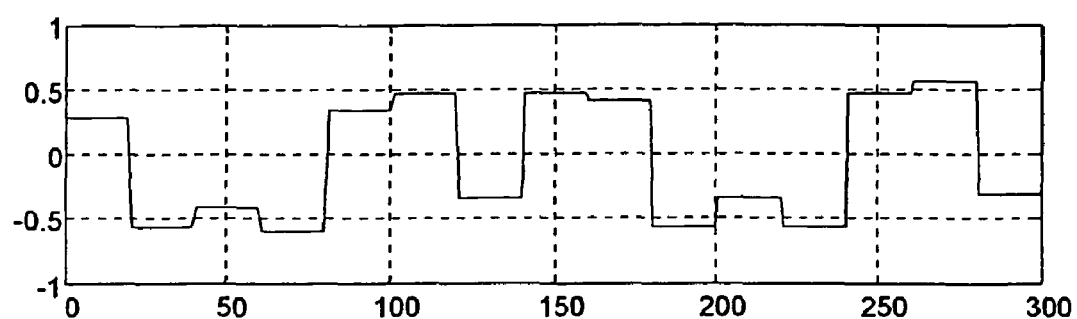
FIGS. 5*a* and 5*b* illustrate the analog signal wave form of MB-FDM UWB system.
Figure 5B:
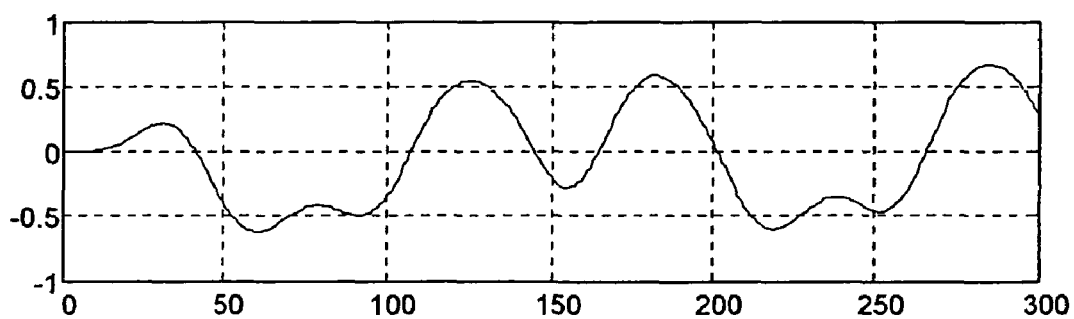

Analog MB-OFDM UWB signal just like the wave form of FIGS. 5*a* and 5*b* received passing by DAC and RF front-end is converted into digital sample information in FIG. 6 in ADC front-end. FIGS. 5*a* and 5*b* illustrate the wave form of analog signal of MB-OFDM UWB system, and FIG. 6 illustrates the digital samples completed of sampling at ADC.

Figure 7:
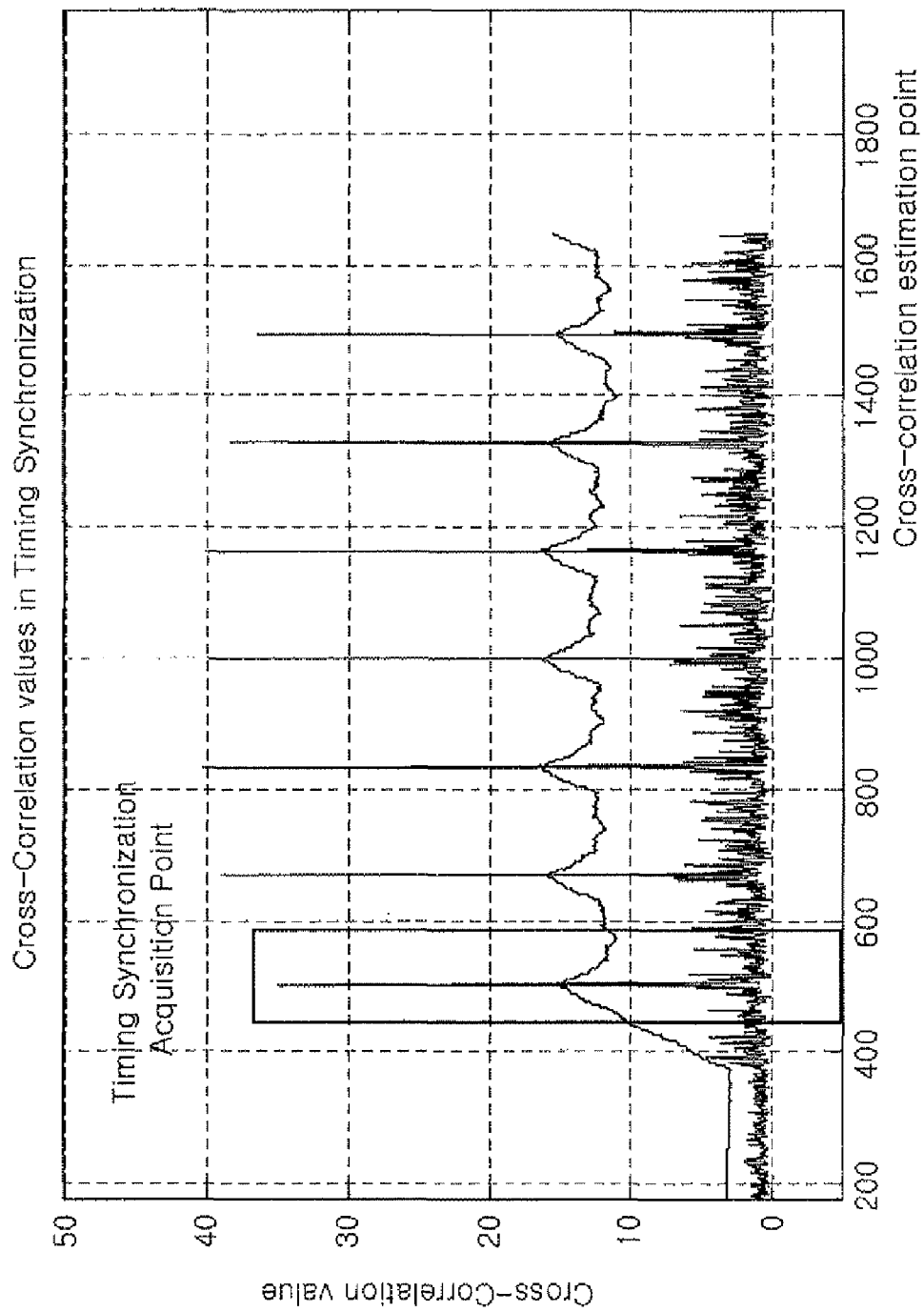
FIG. 7 illustrates the example of timing synchronization algorithm execution result based on FIG. 4.

FIG. 7 illustrates the example of timing synchronization algorithm execution result based on FIG. 4. It illustrates the execution result of cross correlation between preamble section signal and packet synchronization sequence already known by specification among the digital samples in FIG. 6 completed of sampling with 528 MHz after ADC front-end. It also presents the result of executing the timing synchronization to find the starting point of 128 FFT Window that executes the packet detection by cross correlation value higher than the standard and detects the maximum value among cross correlation values within certain section.

Figure 8:
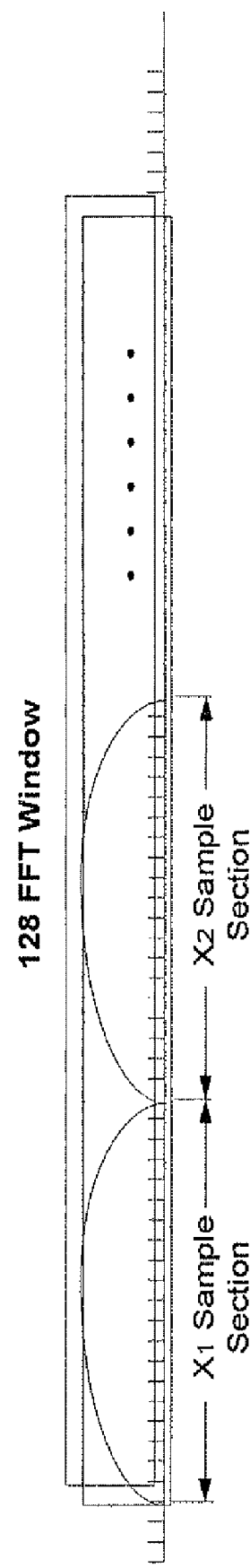
FIG. 8 illustrates the example of classifying same sample section at analog received signal like FIG. 5*b* into 20 digital sample sections.

Starting point of sampling to acquire digital sample information like FIG. 6 from analog receive signal in FIG. 5*b* to ADC front-end may differ for each packet. The cross correlation value at timing synchronization acquisition point acquired from each of 20 sections within same sample section after classifying analog signal like FIG. 5*b* as the sample section 20 time higher than 528 MHz just like FIG. 8, executing the ADC sampling setting one of the 20 sections within same sample as the starting point and executing timing synchronization in FIG. 7 using digital received information completed of sampling can be illustrated as FIG. 9. FIG. 8 illustrates the example of classifying same sample section at analog received signal like FIG. 5*b* into 20 digital sample sections, and FIG. 9 illustrates the cross correlation value and extent of timing synchronization at timing synchronization acquisition point based on sampling location within 20 same sample sections classified in FIG. 8.

Figure 9:
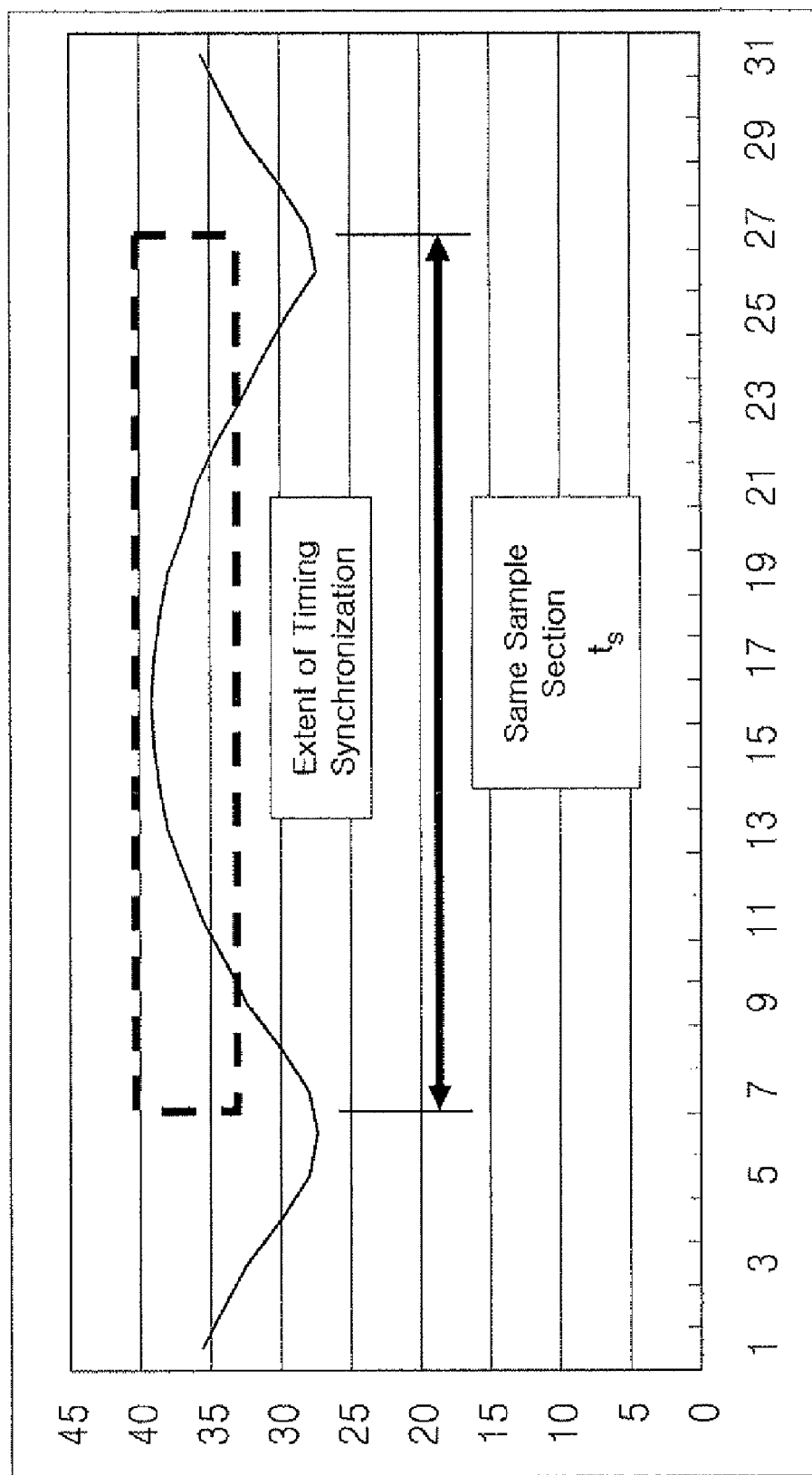
FIG. 9 illustrates the cross correlation value and extent of timing synchronization at timing synchronization acquisition point based on sampling location within 20 same sample sections classified in FIG. 8.

Disclosed in the result of FIG. 9, the starting point of 128 FFT Window acquired by the timing synchronization of each packet exists with same probability for any section within same sample sections in extent same as the Equation (1) with center of same sample section (Ts) as its basis.

$$-0.5Ts \leq \text{Extent of Timing Synchronization} < 0.5Ts \qquad (1)$$

Figure 10:
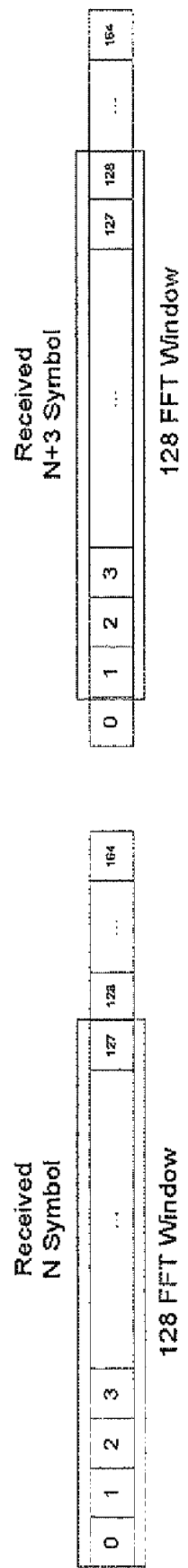
FIG. 10 illustrates an example where FFT window shift by FFT window transition occurs between two OFDM symbols in comparison by sampling clock offset.

Considering the starting point of 128 FFT Window by such timing synchronization together with the FFT Window transition by sampling clock offset calculated in FIG. 3, it is disclosed that precise location of 128 FTT Window detected by timing synchronization moves as OFDM symbol progresses within the sending packet. When such FFT window movement occurs within the 24 preamble sections that carry out the time domain synchronization algorithm maintaining the precise 128 FFT Window, error by synchronization algorithm will expand and it may be fatal to performance of system. For example, interval of two OFDM symbol to estimate the frequency offset of TFC mode 1, 3 is 3 symbols when frequency offset of 40 ppm exists between sending/receiving LO. FFT window of two OFDM symbols to estimate the frequency offset must be in perfect match for the preciseness of the estimation and it becomes very difficult to estimate precise frequency offset when samples of two OFDM symbol, target of comparison, is dislocated due to occurrence of FFT window shift by sampling clock offset between FFT window of two OFDM symbols. As seen from FIG. 3, dislocated value of sample per OFDM symbol is 0.0066 sample section in case there exists frequency offset of 40 ppm and interval of OFDM symbol sent with same frequency used to estimate the frequency offset is 3 in case of TFC mode 1,3. Thus, maximum of 0.0198 sample section will be dislocated between two OFDM symbols. FFT window to become 128 FFT input differs a little for each OFDM symbol and location of sample that forms the FFT window may differ even between the OFDM symbols that estimates the frequency offset as FIG. 10 in worst cases. FIG. 10 illustrates an example where FFT window shift by FFT window transition occurs between two OFDM symbols in comparison by sampling clock offset. Estimation of frequency offset is carried out by detecting the relative phase difference of same sample location of two OFDM symbols sent with same frequency. Therefore, big error may occur to frequency offset when value of the same sample location in comparison differs. FIG. 11 illustrates the calculation of frequency offset estimated for each SNR in case frequency offset in AWGN environment is 0 ppm and in case value of same sample location in comparison has changed through simulation. FIG. 11 illustrates the simulation analysis on frequency offset estimated error based on shift of FFT and it is disclosed that FO estimated in FIG. 11 is as same as error of FO since imposed FO is 0 ppm.

As illustrated in FIG. 11, FO imposed in simulation to estimate frequency offset is 0 ppm thus estimated FO value should be near 0 ppm. However, big error occurs in frequency offset estimated in aspect of standard deviation when value of same sample location of two OFDM symbols in comparison is dislocated.

Algorithm that is affected by the FFT window shift in receiving structure of FIG. 4 is the frame boundary detection algorithm to separate the channel estimation sequence using similar algorithm with FO estimation algorithm. To prevent the error by FFT window shift in synchronization algorithms using time domain received signal before such FFT, it is important to design receiving structure so that there would be no FFT window shift within the preamble section.

Figure 12:
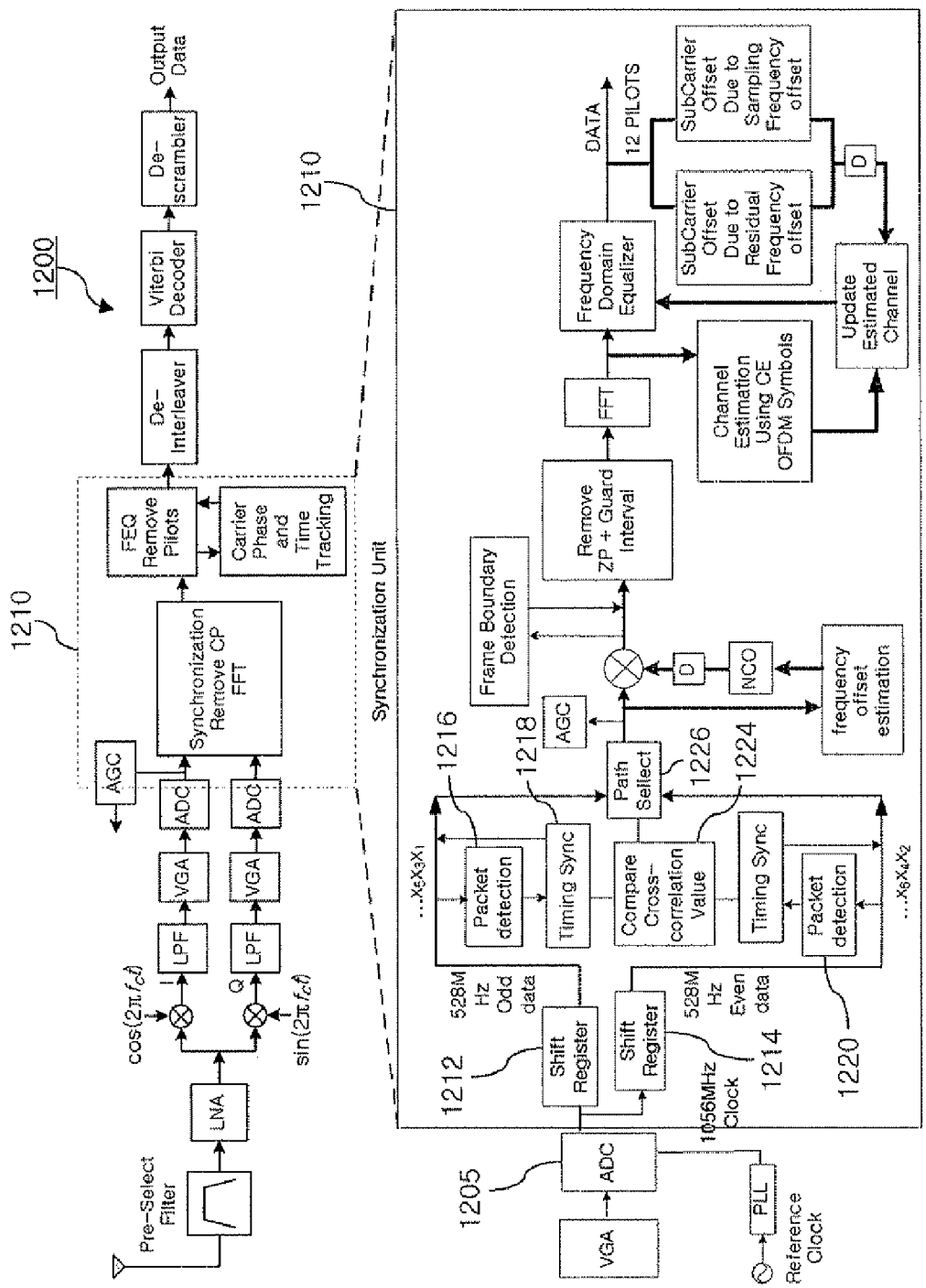
FIG. 12 illustrates the composition of apparatus for receiving signal for extent limitation of timing synchronization in MB-OFDM UWB system.

To prevent the synchronization error in synchronization algorithms using time domain received signal before FFT within such preamble section, the invention propose the new receiving structure as FIG. 12.

FIG. 12 presents the composition of apparatus for receiving signal for extent limitation of timing synchronization in MB-OFDM UWB system.

As illustrated in FIG. 12, apparatus for receiving signal (1200) for extent limitation of timing synchronization in MB-OFDM UWB system, which comprises shift registers (1212, 1214) configured to divide the digital samples completed of sampling by ADC (1205) into the ODD data and EVEN data path, two packet detectors (1216, 1220) and timing synchronizer (1218, 1222) configured to execute the packet detection and timing synchronization of ODD data and EVEN data path respectively, a comparator (1224) configured to compare the cross correlation value at timing synchronization point at ODD/EVEN, a synchronization unit (1210) configured to consist of EVEN data path, a path selector (1226) configured to select the data of path with larger cross correlation value between above ODD data path and EVEN data path based on the outcome of comparison executed by the comparator (1224) as a means for synchronization acquisition.

Figure 16:
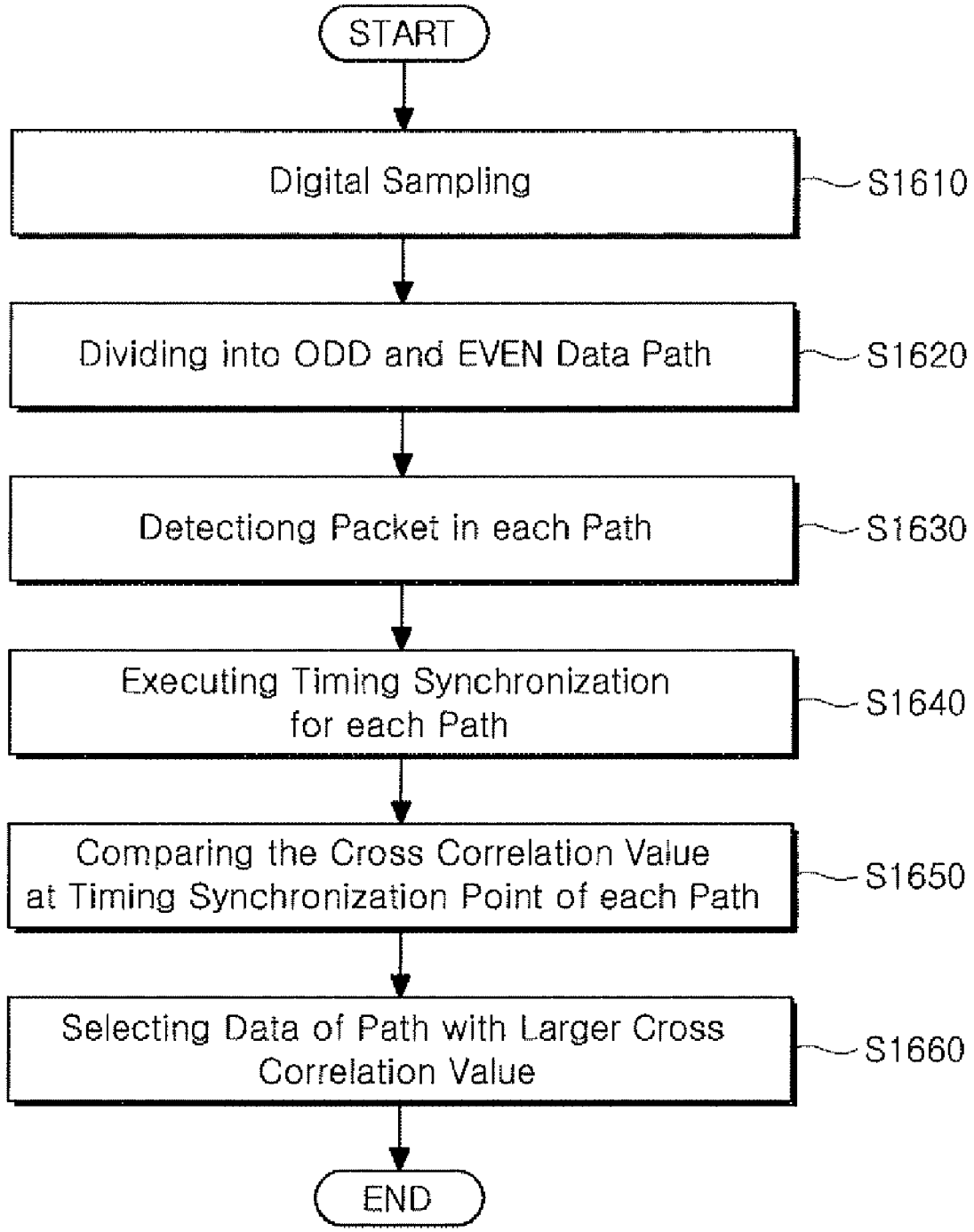
FIG. 16 is a flow chart that presents the procedures for method of receiving signal for extent limitation of timing synchronization in MB-OFDM UWB system.

The operation of the units will be described referring to FIG. 16. FIG. 16 is a flow chart that presents the procedures for method of receiving signal for extent limitation of timing synchronization in MB-OFDM UWB system.

As illustrated above, in synchronization unit (1210) of apparatus for receiving signal for extent limitation of timing synchronization in MB-OFDM UWB system, digital samples completed of sampling with 1056 MHz by ADC (1205) in operation S1610 are divided into ODD data path and EVEN data path of 528 MHz by two shift registers (1212,1214) in operation S1620, packet detection and timing synchronization by packet detector (1216, 1220) and timing synchronizer (1218, 1222) is executed in operations S1630 and S1640, comparison on which has path with larger cross correlation value at timing synchronization point between ODD data path and EVEN data path by the comparator (1224) is carried out in operation S1650 and data of path with large value among cross correlation values at the point of timing synchronization acquisition by the path selector (1226) is selected in operation S1660. Although the receiving structure in FIG. 12 is twice as high in ADC sampling clock compared to receiving structure of FIG. 4 and requires the additional hardware for packet detection and timing synchronization, it has advantage in that error by synchronization algorithm may be prevented by keeping off the occurrence of FFT window shift within preamble section.

Figure 13:
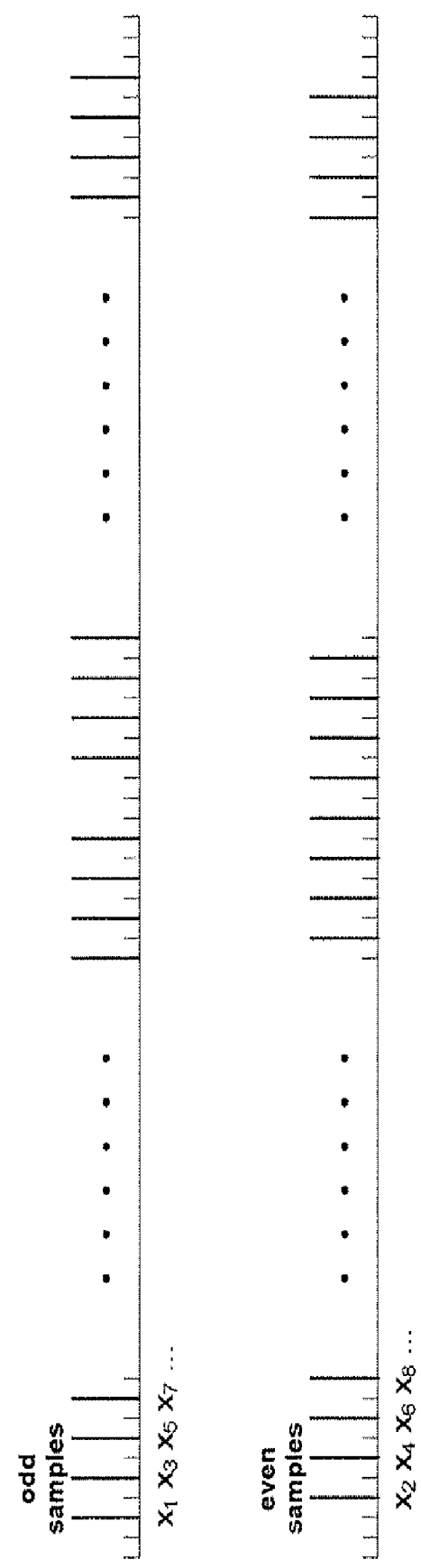
FIG. 13 illustrates the digital information of ODD and EVEN data path completed of sampling with 528 MHz.

Digital information after ADC (1205) in FIG. 12 can be separated as ODD and EVEN data with 528 MHz sampling clock as FIG. 13. FIG. 13 presents the digital information of ODD and EVEN data path completed of sampling with 528 MHz.

Figure 14:
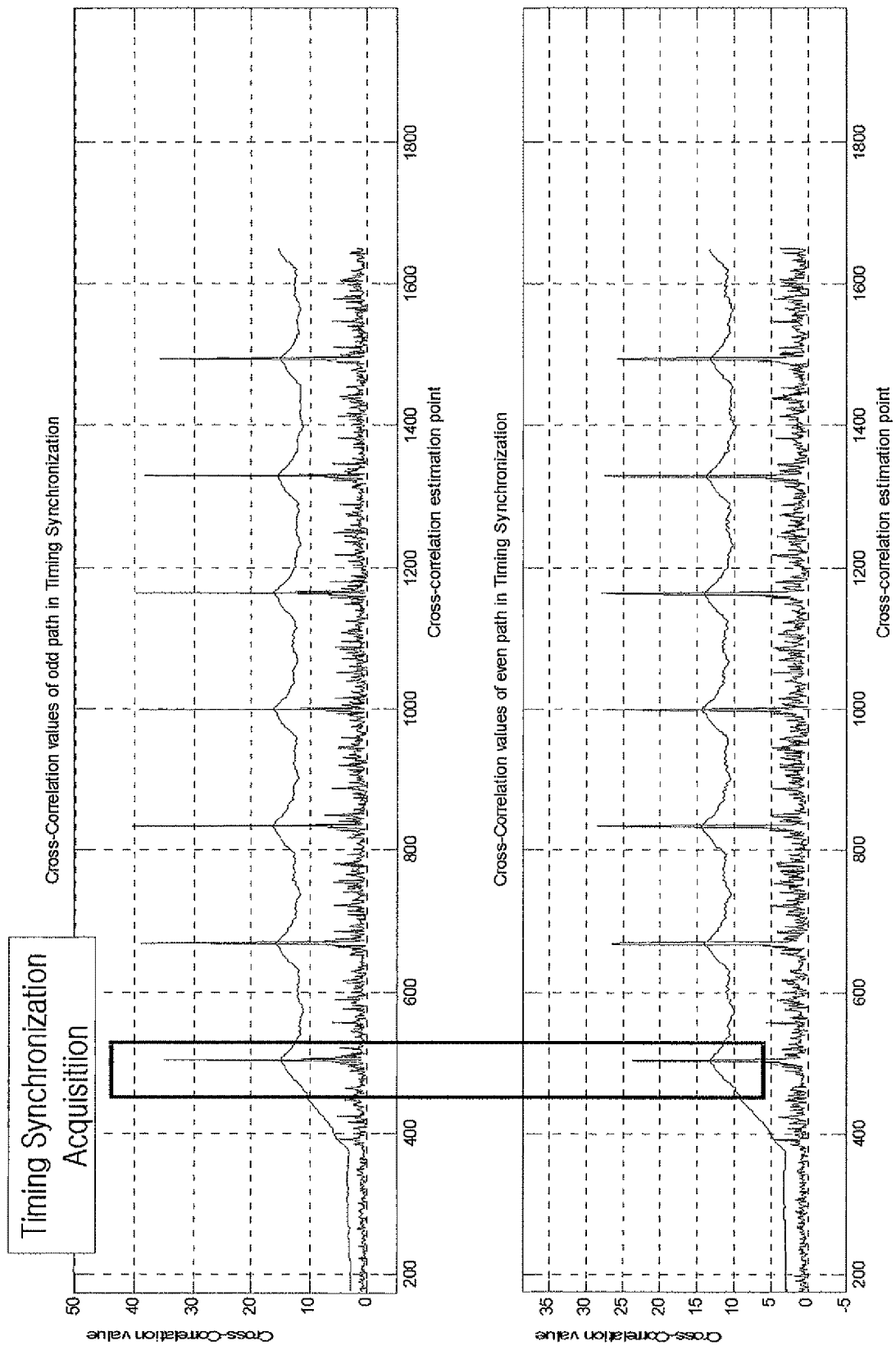
FIG. 14 illustrates the examples of timing synchronization results in ODD and EVEN data path.

When executing the timing synchronization algorithm using the ODD and EVEN data in FIG. 13, the result in FIG. 14 can be acquired. When selecting the data of path with larger value among cross correlation values at the point of timing synchronization acquisition in FIG. 14, extent of timing synchronization that presents the starting point of FFT window acquired by proposed receiving structure is proposed as FIG. 15 and it can be expressed as Equation (2).

Figure 15:
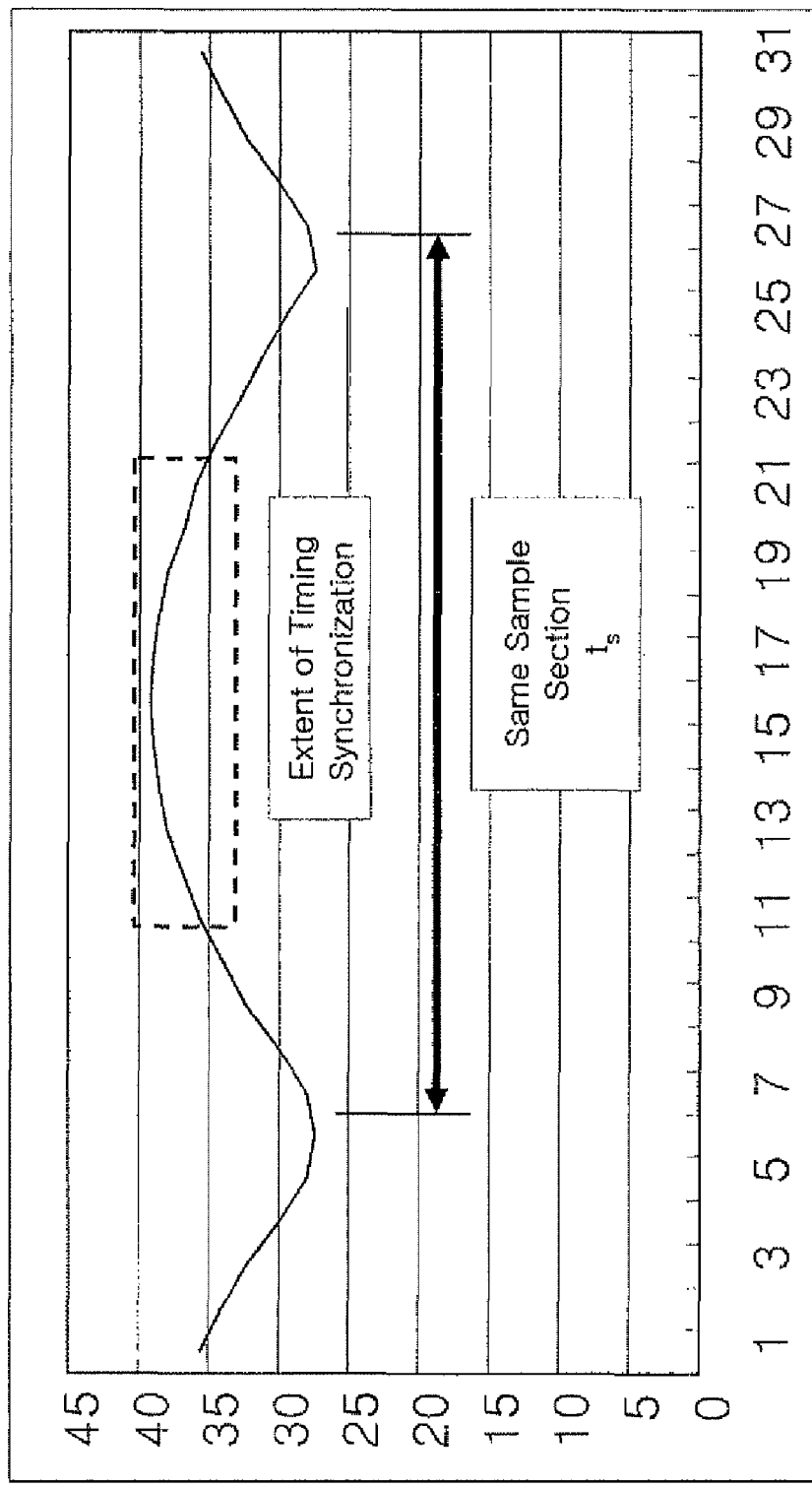
FIG. 15 illustrates the restriction of extent of timing synchronization within same sample section.

FIG. 14 presents the examples of timing synchronization results in ODD and EVEN data path and FIG. 15 presents the restriction of extent of timing synchronization within same sample section.

$$-0.25Ts \leq \text{Extent of Timing Synchronization} < 0.25Ts,$$
$$(Ts: \text{sample section}) \quad (2)$$

Value of sample dislocated per OFDM symbol in maximum sampling clock offset 40 ppm allowed between sending/receiving-end is 0.0066. Therefore, maximum 128 FFT Window transition value that may be occurred during preamble section consisting of 30 OFDM symbols is 0.198 (0.0066*30).

Considering the extent of timing synchronization acquired as FIG. 15 in new receiving structure, the value is lower than the 0.25 sample section required for FFT window to deviate from same sample section.

Thus, it is disclosed that the error by synchronization algorithm can be prevented using time domain received signal information based on FFT window shift when using the newly proposed receiving structure.

Although apparatus and method for receiving signal for extent limitation of timing synchronization in MB-OFDM UWB system in the invention demands the twice the ADC sampling clock to restore the received signal in MB-OFDM UWB system using time frequency hopping and addition of hardware for the packet detection and timing synchronization, it may not only increase the rate of initial synchronization acquisition by limiting the extent of timing synchronization extent to the extent with large cross correlation value within even same section maintaining the modem core system clock as 528 MHz but also prevents the FFT window shift within preamble section to provide the condition where synchronization algorithm using time domain received signal may operate with more stability.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claim is:

1. An apparatus for receiving signal for extent limitation of timing synchronization in multi-band orthogonal frequency division multiplexing ultra wide-band (MB-OFDM UWB) system as a means for synchronization acquisition at receiving structure of MB-OFDM UWB system, the apparatus comprising:
   two shift registers configured to divide digital samples completed of sampling by analog to digital converter (ADC) into a $1^{st}$ and $2^{nd}$ data path;
   two packet detectors and timing synchronizer configured to execute packet detection and timing synchronization of $1^{st}$ data and $2^{nd}$ data path respectively;
   a comparator configured to compare the cross correlation value at timing synchronization point at $1^{st}$ and $2^{nd}$ data path; and
   a path selector configured to select the data of path with larger cross correlation value between above $1^{st}$ data path and $2^{nd}$ data path based on the outcome of comparison executed by the comparator.

2. The apparatus of claim 1, wherein the digital samples are completed of sampling with twice the minimum sampling clock required to restore the MB-OFDM received signal by above ADC.

3. The apparatus of claim 1, wherein the minimum sampling clock is 528 MHz.

4. The apparatus of claim 1, wherein the $1^{st}$ data is ODD data and the $2^{nd}$ data is EVEN data.

5. The apparatus of claim 1, wherein the extent of timing synchronization is limited to be same or over −0.25 times and less than 0.25 times of same sample section when data of path with larger cross correlation values is selected by the path selector.

6. The apparatus of claim 5, wherein the maximum transition value of a Fast Fourier Transform (FFT) window is less than the extent of timing synchronization.

7. A method for receiving signal for extent limitation of timing synchronization in MB-OFDM UWB system as a means for synchronization acquisition in receiving structure of MB-OFDM UWB system, the method comprising:
   executing the sampling with twice minimum sampling clock required to restore the MB-OFDM received signal;
   dividing the received data completed of sampling into a $1^{st}$ data path and a $2^{nd}$ data path with the minimum sampling clock;
   executing packet detection and timing synchronization for the $1^{st}$ data path and $2^{nd}$ data path respectively;
   comparing the cross correlation value at the timing of synchronization point of the $1^{st}$ and $2^{nd}$ data path; and
   selecting the data of path with larger cross correlation value between the $1^{st}$ and $2^{nd}$ data path.

8. The method of claim 7, wherein the minimum sampling clock is 528 MHz.

9. The method of claim 7, wherein the $1^{st}$ data is ODD data and the $2^{nd}$ data is EVEN data.

10. The method of claim 7, wherein the stage where timing synchronization is limited to be same or over −0.25 time and less than 0.25 times of same sample section is added after the path selection.

11. The method of claim 7, wherein the maximum transition value of a Fast Fourier Transform (FFT) window is less than the extent of timing synchronization.

* * * * *